Patented May 19, 1942

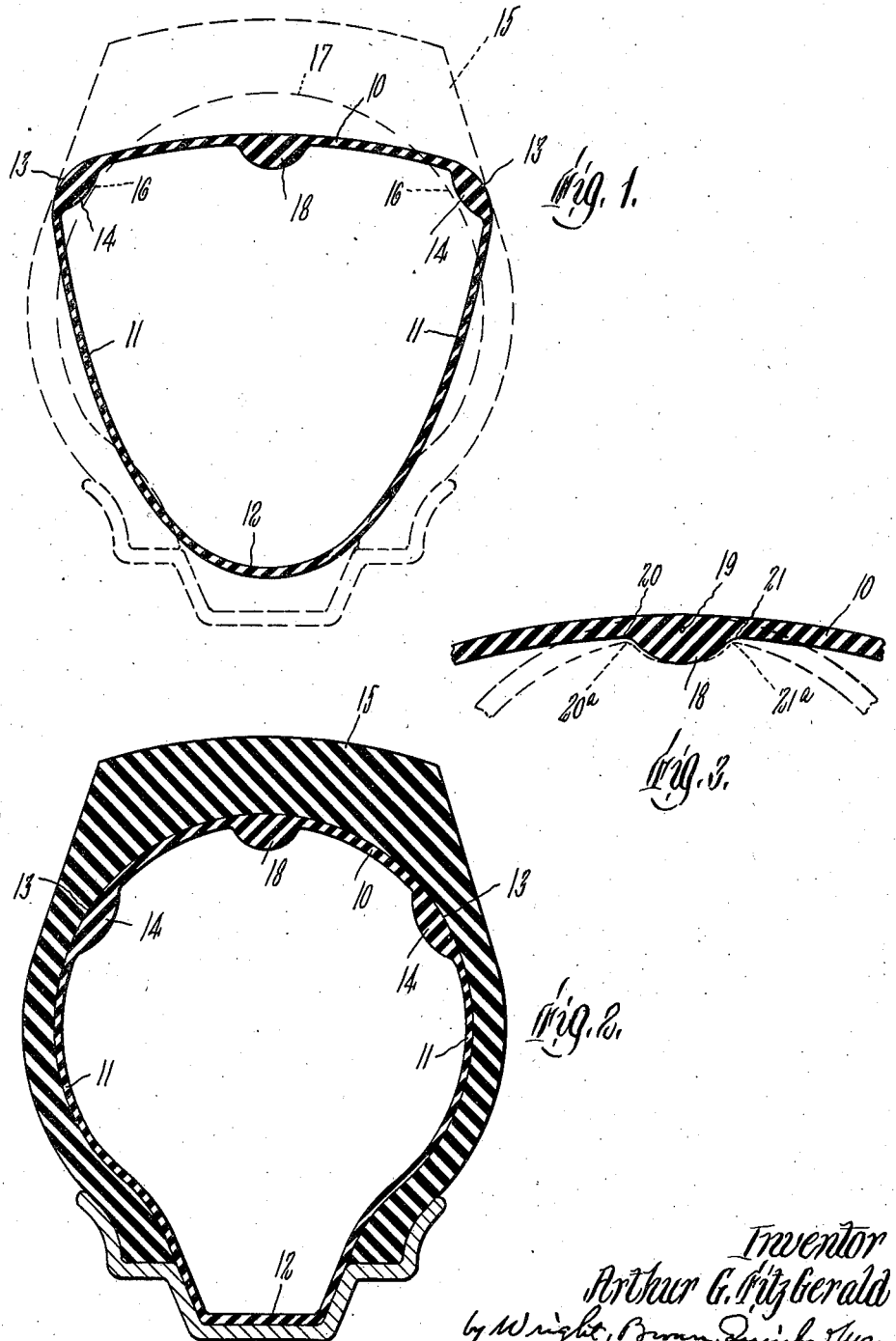

2,283,801

UNITED STATES PATENT OFFICE 2,283,801

SELF-SEALING PNEUMATIC INNER TUBE

Arthur G. Fitz Gerald, Newton, Mass.

Application May 15, 1939, Serial No. 273,702

3 Claims. (Cl. 152—348)

The present invention is concerned with inner tubes of the compression tread type for pneumatic tires. A tube of this type is one which, when placed within a tire casing of appropriate cooperative dimensions and inflated, is put under compression as to its tread portion so that, when such tread portion is punctured by a nail or similar object, the compressive stresses existing in the resilient tread material cause the material to press against the puncturing object on all sides closely and firmly enough to prevent leakage of air from the tire. More particularly, the invention is concerned with tubes of the character shown in my prior patent No. 2,041,750, dated May 26, 1936, and embodies an improvement over the invention therein disclosed. However, it is not limited to combination with tubes of the specific characteristics shown in that patent, but may be embodied in tubes of other designs and structural characteristics.

The object of the invention is to obtain a better and more efficient sealing effect. By this I mean that an equally good sealing effect may be obtained with the use of considerably less material in the tread portion of the tube, or a substantially superior sealing effect with the same amount of material, or a better effect with somewhat less material. This object is accomplished by providing the tube with an integral bead extending longitudinally of the tread portion thereof (that is, circumferentially of the tube, considered as a wheel), between the lateral bounds or shoulders of such tread portion, the rib being of a formation such that it is distorted, with the development of internal compressive stresses, in conforming itself to the inner surface of the tire casing. Such bead accomplishes another useful result, in that it diminishes the tendency of the tube to take a permanent set under long persistence of the inflation pressure and extends the period during which puncture sealing compression is maintained in the tread.

One illustrative embodiment of the invention is shown in the drawings and described in the following specification, but without intention to imply a limitation of the invention to that illustration.

In the drawing—

Fig. 1 is a cross sectional view of an inner tube containing this invention in its relaxed or unstressed condition, shown superimposed on the cross sectional outline of a tire casing to illustrate the approximate ratios of its dimensions to those of the casing with which it is designed to be used. The section of a wheel rim is likewise indicated in this figure;

Fig. 2 is a cross section of the same inner tube inflated within the tire casing for which it is designed;

Fig. 3 is a fragmentary diagrammatic view on a larger scale showing the effect of distortion of the central part of the tube tread when the tire is inflated;

Like reference characters designate the same parts wherever they occur in all the figures.

The material of which the inner tube is made may be vulcanized natural rubber or any synthetic compound having characteristics suitable for inner tube use, all of which compounds are herein comprehensively designated and included by the term "rubber." It is formed with a tread portion 10, side walls 11 and belly 12. In the illustrated embodiment, the junctions 13 between the margins of the tread and side walls are thickened. In this embodiment such junctions form distinct salient shoulders and the additional thickness there is provided by internal beads 14. The width of the tread 10 is greater than the length of the interior transverse arc at the crown of the tire casing 15 for which a given tube is designed between the zones of the casing on which the shoulders 13 bear when the tube is inflated therein. The approximate locations of such zones are indicated by the reference characters 16. The transverse curvature of the tread is flatter than the interior of the casing; and its greatest external circumference (considered around the axis of the wheel) is of shorter diameter than the corresponding circumference including the crown 17 of the casing. Thus in the unconfined and uninflated condition of the tube, the width between the shoulders 13 is substantially greater than the straight line or chordal distance between the zones 16.

An internal bead 18 is formed on the inside of the tread portion extending longitudinally (circumferentially) thereof, i. e., circumferentially of the wheel. This bead is located midway, or nearly midway, between the shoulders 13. The portion of the tread in which the bead is located may be called the median zone of the tread, the term "zone" being defined as a circumferential area wider than the bead and wide enough to include all locations of the bead which fulfill the objects of the invention.

When a tube having the characteristics described is placed in a tire casing of cooperative dimensions, that is, the tire for use in which a particular tube embodying the invention is designed, the shoulders 13 come first into contact with the inner walls of the casing. These shoulders, with their internal ribs 14, form in effect rings or hoops surrounding the axis of the tube in parallel planes, which have substantially greater stiffness than the side walls and tread of the tube and are strongly resistant to compression to a diameter less than their molded and unstressed diameters. Therefore they are brought nearer to one another by the reaction of the casing walls. Their movement of approach to one another, combined with the pressure of the inflation air when the whole tire is in place on a wheel, forces the tread into conformity with the casing and puts the tread under compression. Compressive stresses are developed in the tread extending tangentially of the cross section from each shoulder toward the other.

The bead 18 at the same time is forced against the crown portion 17 of the casing. Owing to the difference between the transverse curvature of the tread in the zone where the bead is located, and the transverse curvature of the contiguous zone of the tire casing, the bead is distored transversely. Although, in the embodiment here shown, the bead is at the same time enlarged in diameter, with respect to the axis of the wheel, the longitudinal stretch thus caused is overcompensated by the transverse compression caused by the bending of the tread in addition to the tangential force exerted through the thickened shoulders. Consequently the rib as a whole is under compressive stress.

The manner in which the rib is distorted when the tread is forced into contact with the casing, is illustrated graphically in Fig. 3. The cross section of the central part of the tread is in effect bent around an interior point 19. This causes points such as 20 and 21 at the margins of the bead to be brought downward and inward to points designated 20a and 21a, whereby the transverse convex arc of the inner surface of the bead is shortened and the substance of the rib is put under compression.

The desired effect of resultant compression in the rib is accomplished when the elongation of the tread in the median zone is in the order of 3% and its transverse compression between the shoulders is in the order of 10%. These values, however, are not limiting, but illustrative only, and a wide variation is possible.

The central rib adds much to the efficiency of the tread in its puncture sealing function. It provides in effect a reactive abutment into which the transverse tangential lines of compressive force developed in the parts of the tread at each side of it are delivered, and from which its resilience causes it to exert compressive force into those parts of the tread. It creates an equilibrium between the forces acting in the flanking zones of the tread, causing the lines of force to be substantially equal in both of such zones, and therefore more evenly and equally distributed throughout the tread as a whole than in the prior constructions. It improves the puncture sealing qualities of the tube, other things being equal.

Indeed the efficiency of the tube in this respect is so much increased that I have found it possible to obtain as good puncture sealing effects as heretofore with a substantially smaller content of rubber in the tread. In practice I have effected savings in the order of 16% in the weight of rubber as compared with tubes lacking the intermediate bead and having a sufficiently thick tread for sealing and being otherwise the same as the tube here shown. This result is important, not only on account of saving in weight and cost to the consumer, but also in reducing the heating effect when the tire is in use on a moving vehicle.

The greater mass of rubber in the bead postpones the time when a permanent set takes place. Rubber, when subjected for a long period to stress, becomes fixed or set so that stresses originally existing in it disappear. When such setting has occurred in the tread portions of tubes initially under compressive stress, the puncture sealing quality is lost. But in tubes embodying this invention, the resilience of the bead persists after permanent setting of the tread zones at either side of it has taken place, whereby the force due to its compression is available to press the material of the adjacent zones against a puncturing object. Thus the period of puncture sealing capability is prolonged by this invention.

What I claim and desire to secure by Letters Patent is:

1. A self-sealing, compression-tread, vulcanized-rubber pneumatic tire tube with a fully elastic tread portion having an excess width when the tube is uninflated and materially less inherent curvature than the tread of the aftermentioned tire casing, said tread portion being bounded by shoulders constructed to resist deformation from their original ring diameter, whereby to constitute abutments for exerting transverse tangential pressure upon such tread portion when the tube is placed in a tire casing of which the width between the zones on which such shoulders come to bear is less than the width of said tread portion, and said tread portion having in its median zone a longitudinally extending bead of which the outer surface is flush and continuous with the adjacent outer surface of the tread, and the inner surface is convex inwardly and is joined by smooth concave curves with the contiguous inner surface of adjoining parts of the tread, said bead, when the tube tread is brought against the crown of a tire casing by inflation and relative approach of said shoulders, being distorted externally into conformity with the crown surface of the tire, and its inner convex part being put under compression by such bending effect.

2. A self-sealing inner tube for pneumatic tires having a vulcanized rubber tread and lateral tread-bounding shoulders; the tread, when uninflated, being of greater width on its outer surface between said shoulders than the prescribed width when inflated in a tire, and having a convex transverse curvature which is inherently substantially flatter than the prescribed curvature when so inflated, said shoulders having greater resistance to distortion from their unstressed ring form than the contiguous parts of the tread, and the tread having a substantially thickened median longitudinal zone with inwardly convex transverse curvature as to its inner surface only, adapted to be put under greater compression by the conjoint effects of inflation pressure and reaction between the parts of the tread and the tire casing in which the tread is inflated, than the portions of the tread between said median zone and shoulders.

3. A self-sealing, compression-tread, vulcanized-rubber pneumatic tire inner tube with a fully-elastic tread wall having an excess width of material when the tube is uninflated and materially less inherent transverse curvature than tire casings of cooperative dimensions, longitudinally extending shoulders bounding said tread wall and a longitudinal bead of substantially less width than the distance between said shoulders in the median zone between said shoulders; the shoulders comprising means for reacting against the walls of an enveloping tire casing of which the width between the zones whereon the shoulders bear when the tube is inserted is less than the distance between the shoulders before insertion, to exert transverse compressive stress in said tread when the tube is inflated in such a casing, and said bead having an outer surface which is transversely continuous with the adjacent outer surface of the tread, and an inner surface which is strongly convex inwardly, the inner portions of said bead being adapted to be put under compressive stress by bending into conformity with the enveloping tire casing, in addition to the stress exerted by the shoulders.

ARTHUR G. FITZ GERALD.